Feb. 21, 1967 A. CLAVIN 3,305,797

MICROWAVE SWITCHING NETWORKS

Filed April 24, 1964 3 Sheets-Sheet 1

INVENTOR
ALVIN CLAVIN

BY Nilsson, Robbins & Anderson
ATTORNEYS

INVENTOR
ALVIN CLAVIN
BY Wilson, Robbins & Anderson
ATTORNEYS

INVENTOR
ALVIN CLAVIN
BY Wilson, Robbins & Anderson
ATTORNEYS

United States Patent Office 3,305,797

Patented Feb. 21, 1967

3,305,797

MICROWAVE SWITCHING NETWORKS

Alvin Clavin, Calabasas, Calif., assignor to Emerson Electric Company, St. Louis, Mo.

Filed Apr. 24, 1964, Ser. No. 362,401
8 Claims. (Cl. 333—1.1)

This invention relates generally to microwave circuits and more particularly to reciprocal and nonreciprocal switching networks utilizing nonreciprocal circuit components.

With the advent and development of compact ferrite junction circulators having excellent electrical characteristics with respect to insertion loss, low VSWR (voltage standing wave ratio), power level required for magnetic field reversal and holding, and long term stability, it has become highly desirable to utilize these circulators as switches in microwave systems in a manner to take advantage, without deleterious compromise, of these and other merits of such components. For example, there is a widely recognized need for dependable, physically small microwave switching networks having these electrical characteristics, in space applications as well as in numerous other modern, sophisticated microwave systems.

A difficulty encountered in the development and provision of such networks heretofore, has been that the junction circulators are inherently nonreciprocal and therefore not obviously useful in the obtaining of reciprocal or certain nonreciprocal switching functions without compromising their physical or electrical characteristics.

Accordingly, it is an object of the present invention to provide a versatile microwave switching network which is physically compact and which exhibits the excellent electrical characteristics of ferrite junction circulators.

It is another object to provide such a switching network which can in accordance with predetermined design, achieve complex $n$ pole-$n$ throw reciprocal or nonreciprocal switching.

Briefly these and other objects are achieved in accordance with the structural aspects of a reciprocal single pole-single throw example of the invention which includes a pair of Y-junction, three-port ferrite circulators, one of which may have a permanently magnetically biased ferrite element while the ferrite element of the other is magnetically biased with a switchable electromagnet. Thusly, when the ferrite magnetizing current is reversed, the sense of circulation of microwave electromagnetic energy associated with the circulator is reversed.

The component circulators are intercoupled with two ports of one connected with two ports of the other. The remaining two ports are network terminals, each serving equivalently as either an input or output terminal. A direct current, reversible source of biasing current is connected to the electromagnet of the reversible circulator as will be discussed more fully below. With the biasing current flowing in one direction through the reversible circulator, the two input-output terminals are reciprocally connected through the network, while in the reverse direction of biasing current, the sense of ferrite magnetization is reversed and the terminals are each reciprocally isolated from the other.

Further details of these and other novel features and their principles of operation as well as additional objects and advantages of the invention will become apparent and be best understood from a consideration of the following description taken in connection with the accompanying drawings which are all presented by way of illustrative example only, and in which:

FIG. 1 is a schematic view of a three-port nonreciprocal ferrite junction circulator utilized as an element of the combination of the switching networks constructed in accordance with the principles of the present invention;

FIG. 2 relates to the electrical characteristics of the junction circulator of FIG. 1 and is a graph of insertion loss and isolation plotted on a common ordinant as a function of frequency along the abscissa;

FIG. 3 also is a graph relating to the operation of the device of FIG. 1 and plots a family of curves of attenuation versus electromagnet coil current for different frequencies;

With specific reference now, to the figures in more detail, it is stressed that the particulars shown are by way of example and for purposes of illustrative discussion only and are presented in the cause of providing what is believed to be the most useful and readily understood description of the principles and structural concepts of the invention. In this regard, no attempt is made to show structural details of the component apparatus in more detail than is necessary for a fundamental understanding of the invention, the description taken with the drawings making apparent to those skilled in the art how the several forms of the invention may be embodied in practice. Specifically the detailed showing is not to be taken as a limitation upon the scope of the invention which is defined by the appended claims forming, along with the drawings, a part of this specification.

Figure 1:
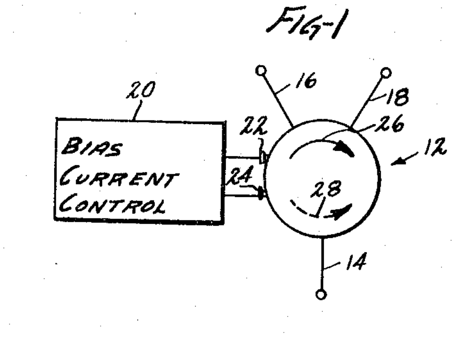

In FIG. 1 a nonsymmetrical ferrite Y circulator 12 is illustrated schematically as a nonreciprocal microwave switching device having an input port 14, constituting for example, the single pole of the switching device, and two output ports 16, 18 which are alternatively or conjunctively coupled to the input port 14 depending upon the state of magnetization of the internal ferrite element of the circulator. The magnetization of the ferrite is controlled by current from a bias current control 20 flowing through leads 22, 24 of an electromagnet coil, not shown, within the body of the circulator 12. It may be noted that when the magnitude of the current from the bias current control 20 is zero, the circulator switching device is substantially symmetrical; that is, energy entrant at the input port 14 may be equally and symmetrically divided between the output ports 16, 18 with some power reflected back to the port 14. When however, in accordance with the contemplated practice, the bias current control is of a predetermined full magnitude in one sense of direction, the action of the circulator 12 is such as to cause the energy impressed upon the port 14 to traverse the circulator in the direction implied by the solid arrow 26 and emerge at the output port 16. Similarly, energy impressed upon the port 16 will traverse the circulator in the same direction of circulatory transmission and emerge at the port 18; and, again, energy impressed upon the circulator at the port 18 will be transmitted through the circulator 12 and emerge at the port 14.

When, however, the magnitude of current from the bias current control 20 is of like magnitude but in the opposite sense of direction, the microwave circulation associated with the circulator 12 is in the sense indicated by the dotted arrow 28 whereby microwave energy impingent upon the device at the port 14 will be transmitted to the output port 18 while energy impressed upon the port 18 will emerge from the circulator at the port 16, and so on.

Thus, it may be seen that the device depicted in FIG. 1 is a nonreciprocal single pole-double throw switch such that, depending upon the state of magnetization of the ferrite element, the input port 14 may be connected through the circulator alternatively to the output port 16 or 18. However, in either state of magnetization, reciprocally directed microwave energy from one of the output ports will be coupled to the other output port instead of back to the input port 14.

Figure 2:
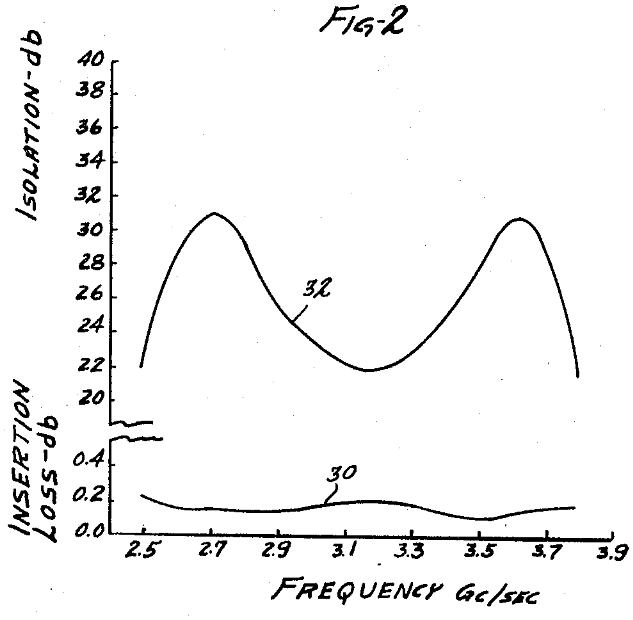
Figure 3:
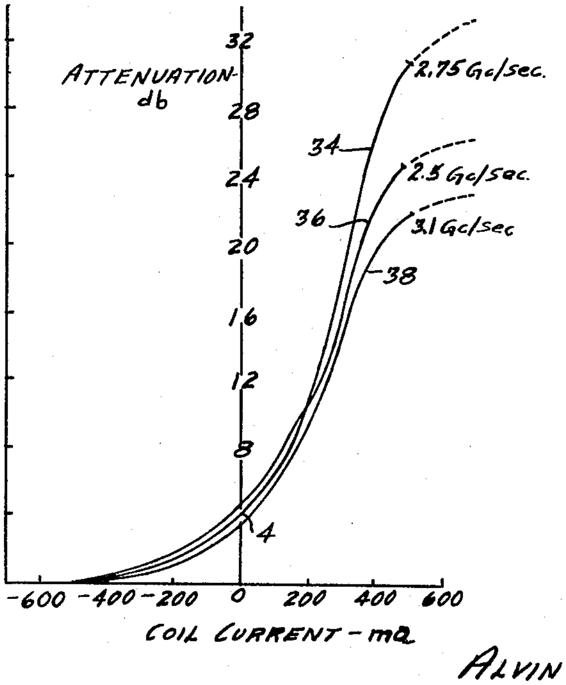

Referring to FIG. 2 and FIG. 3, some of the electrical characteristics of the ferrite circulator of FIG. 1 are illustrated in graph form. In FIG. 2 a curve 30 is plotted to show the insertion loss in decibels (db), as a function of the input frequency in gigacycles per second, between the input port and the output port to which it is connected. Similarly the curve 32 shows the isolation in db between two non-connected ports of the circulator. It may be noted that over a band from 2.5 to 3.8 gigacycles, the ratio of isolation to insertion loss is at least 150 and varies between 150 and 200. In FIG. 3 the attenuation between two of the circulator ports at different frequencies is shown as a function of coil current from the bias current control 20. For example, the curve 34 illustrates that with the coil current in one sense of direction with a magnitude of approximately 500 milliamps, the two ports are connected with substantially zero attenuation for microwave energy traversing the circulator in a given direction. With a coil current of zero magnitude, the input energy suffers approximately 4 db of attenuation between the same two points in the same direction; although it may be noted that in this state of magnetization, the device is substantially reciprocal in nature. When the coil current is approximately 500 milliamperes in the opposite direction, the two ports are isolated as indicated by the fact that energy traveling in a given direction between the two ports suffers an attenuation of approximately 25 db. The curves 36, 38 demonstrate similar performance for microwave signals traversing the circulator in the same direction from the same two ports at the frequencies indicated by the numbers associated on the graph respectively with each of the curves.

An important characteristic may be noted from the curves of the graph of FIG. 3, viz., it is difficult to overdrive the disclosed switch. In other words, the isolation and insertion loss show little change when additional current is applied to the unit, that is (in connection with the example illustrated in FIG. 3) when the driving current is greater than plus or minus 500 milliamps. This obviously is not true in Faraday rotation switches or switches utilizing phase shift principles. The fact that the switches are not current sensitive in this manner, is an advantage to the systems engineer who therefore need not be concerned about the design and the expense of a precision driver for the switching device. Hysteresis measurements have shown the switch to have a maximum separation of 2 db between increasing and decreasing currents after driving the switch into saturation. Some of this hysteresis is known to be due to the iron coilforms utilized and will be further minimized in the course of future developments in that art.

The coil current required is of course arbitrary and can be controlled by the number of turns and wire size. However, when fast switching is required, inductance must also be controlled, thereby diminishing the magnitude of freedom of choice in the coil design. It should be further noted that the holding power can be made extremely small by careful design. For example, a particular switching device constructed in accordance with the principles of the present invention for utilization in space applications required a current of only 10 milliamps at 1.75 volts for excellent operation.

Figure 4:
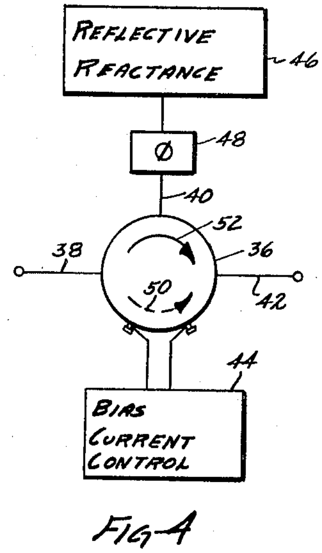
FIG. 4 is a schematic view of an example of a switching network constructed in accordance with the principles of the present invention.

Referring to FIG. 4, an example of the invention is illustrated in which a nonsymmetrical ferrite Y circulator 36 is utilized to achieve certain symmetrical and reciprocal results. The circulator 36 may be considered as having an input port 38, a first output port 40 and a second output port 42. Again the circulator is switchable depending upon the magnitude and direction of current supplied from a bias current control 44. That is, when current with a given magnitude in one direction is supplied, the input port 38 is connected to the output port 40, while with biasing current in the opposite direction of the same magnitude, the input port 38 is connected to the output port 42.

In this example, the output port 40 is coupled to a reflective reactance element 46 which may be a simple short circuit serving the function of reflecting output energy from the port 40 back into the same port. Intercoupled between the reflector reactance 46 and the output port 40 is a variable length phase shifting line 48. In a practical example of this embodiment of the invention, the reflective reactance and the variable length phase shifting line 48 have been constructed as a unitary adjustable length short circuit. The effective length of the line 48 may be chosen so that with a zero magnetic field in the ferrite element of the circulator, input energy at port 38 is split and arrives at the output port 42 in two components which are 180° out of phase, thusly effectively cancelling any output signal at the output port 42. In other words, that portion of the input energy which traverses the circulator 36 in the direction of the dotted arrow 50 is transmitted directly from the input port 38 to the output port 42; while that portion of the input energy which traverses the circulator in the direction of the solid arrow 52 is transmitted first to the output port 40 thence through the line 48 to the reflective reactance 46 and back to the port 40 from whence it is then transmitted to the output port 42. With proper phase shift associated with the line 48, the energy traveling the route implied by the solid arrow 52, suffers 180°, or $n$ pi radians, more phase shift than that experienced by the dotted arrow path 50; so that with zero magnetic field, there is no output at the port 42.

When, however the circulator is magnetized in the direction indicated by or associated with the solid arrow 52, all of the energy from the input port 38 traverses the circulator 36 to the output port 40 from whence it is reflected and again traverses the circulator to the output port 42. With exactly the same result, the input port 38 is connected to the output port 42 with the direction of traversal indicated by the dotted arrow 50 when the direct current output of the bias current control 44 is reversed in sense.

Thusly, a reciprocal balanced switch having single pole-single throw characteristic has been shown and described in connection with FIG. 4. To reiterate, in this device one of the three ports is terminated in an adjustable length short circuit. In one direction of circulation, the power at the input terminals is transmitted to the short circuit, is reflected, and emerges from the output terminal 42. In the other direction of circulation, indicated by the dashed arrow, the power at the input feeds directly to the output terminal.

Therefore, in both switched positions the input is connected to the output, while at zero magnetic field, the direction of circulations are opposite and equal in magnitude. It is readily possible to adjust the effective phase length of the short circuit so that at the output, the two paths will be 180° out of phase and the energy will be reflected back to the input. When this balance is achieved, the switch has total reflections at zero field and transmits in either direction of the applied magnetic field. This device besides acting as a switch, provides when desired, the function of balanced modulation when its solenoid is driven by a symmetrical, periodic waveform. That is, the output will contain an upper and low side band spectrum with a suppressed carrier. It may be noted that for broad band performance, the magnitude of phase shift associated with the line 48 should have the smallest possible value.

Figure 5:
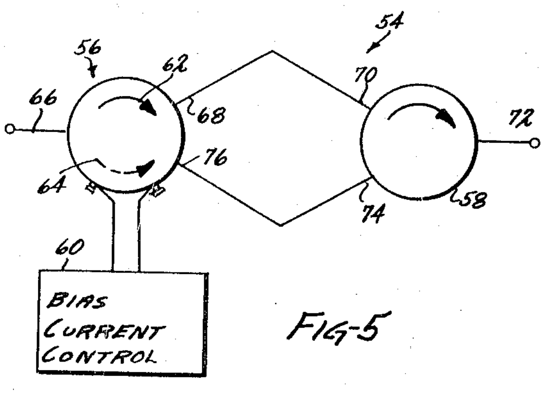
FIG. 5 is a schematic view of a single pole-single throw reciprocal switching network.

In FIG. 5, an example of the invention is illustrated in which a reciprocal single pole-single throw switching network is synthesized from a switchable or reversible ferrite circulator 56 and a steady state or nonreversing three-port ferrite circulator 58. As in the previous examples, with the biasing current from the control 60 impressed upon the electric magnetizing coil in the circulator 56 in one direction, the sense of rotation associated with the circulator is in the direction implied by the solid arrow 62 and in the direction indicated by the dotted arrow 64 when the current is impressed upon the coil in the reverse direction. It may therefore be seen that when the magnetization is in the direction associated with the solid arrow 62, input microwave energy impressed upon the input port 66 is coupled to the output port 68 and thence to an input port 70 of the nonreversing circulator 58 from whence it is transmitted to the output terminal 72 of the network. The network is reciprocal in this state because energy impingent upon the output terminal 72 is transmitted to the terminal 74 of the circulator 58 and thence to the terminal 76 of the circulator 56 from whence it is transmitted directly to the network input terminal 66.

When the sense of the circulator 56 is reversed to the direction indicated by the dotted arrow 64, input energy from the port 66 is transmitted to the port 76, thence to the port 74 of the circulator 58 and thence to the port 70 thereof and back to the port 68 of the circulator 56 from whence it is transmitted directly to the input terminal 66. It may therefore be seen that in this state of the network the input terminal 66 is not connected to the output terminal 72. It may further be seen that the network is reciprocal in this state in that microwave energy impingent upon the terminal 72 is in like manner carried around the network and returned to the same port.

In the examples of the invention illustrated in FIGS. 6–10 a nomenclature for the ports and terminals of the circulators described will be used which is an alternative to that utilized in connection with the more elementary embodiments of the invention described above. The difference in nomenclature will be seen to comprise a designation for the three-ports of each circulator as ports 1, 2, 3 thereby defining a sense of rotation characteristic of a direction of microwave circulation indicated in each case by the solid arrow.

Figures 6, 9:
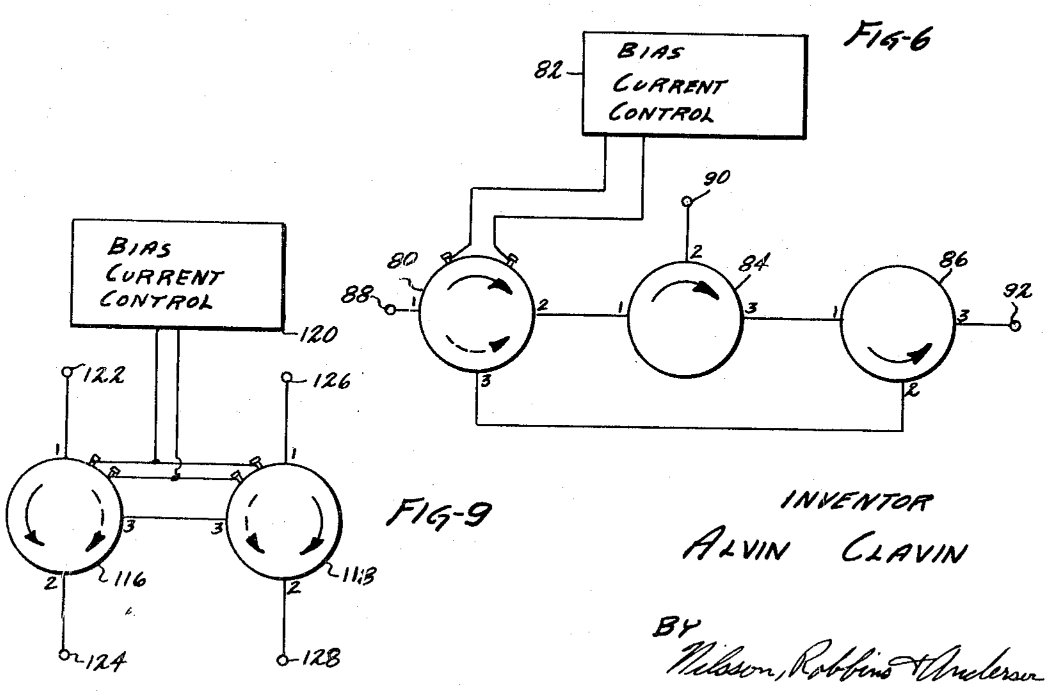
FIG. 6 is a schematic view of a reciprocal single pole-double throw switching network of the invention.
FIG. 9 is a schematic view of a double pole-double throw nonreciprocal switching network of the present invention.

In FIG. 6 a reciprocal single pole-double throw switching network is illustrated which includes a switchable or reversible circulator 80 with an associated bias current control 82, and a pair of nonreversing ferrite circulators 84, 86. Each of the circulators in the network has a first, second and third port connected therewith as indicated by the reference numerals 1, 2, 3, in each case. These will hereafter be referred to as a port 1, 2 or 3, or alternatively, as the first, second or third ports of a particular circulator. Note again that the direction of ascending sequence of the number designating the ports is in each case in the direction of the solid arrow of either the switchable circulator 80 or the nonreversing, fixed circulators 84, 86. The first port of the circulator 80 is connected, in this example, to the input terminal 88 of the single pole-double throw reciprocal switching network and its second port is connected to the first port of the circulator 84. The second port of the circulator 84 is connected to the first output terminal 90 of the network. The third terminal of the circulator 84 is coupled to the first terminal of the circulator 86 while the third port of the latter is connected to the second output terminal 92 of the network. The second port of the circulator 86 is connected back to the third port of the switchable circulator 80.

In operation the single pole-double throw reciprocal switch network of FIG. 6 operates to connect the input terminal 88, alternatively, to the first output terminal 90 or to the second output terminal 92 of the network. With the state of circulation of the circulator 80 as shown by the solid arrow therewithin, the input terminal 88 is connected to the second port of the circulator 80 and thence to the first port of the circulator 84. Then, as indicated by the solid arrow within the circulator 84, the first port thereof is connected to the second port and thence to the first output terminal 90.

In this state of the network, energy reflected from the output terminal 90 is transmitted through the second and third ports of the circulator 84, thence through ports 1 and 2 of the circulator 86, and then back to the circulator 80 within which the reflected energy is transmitted from the third to the first port thereof. Hence it may readily be seen that the network is, in this state, reciprocal. It may be noted, however, that the forward and reverse phase of the switching network may be different unless consideration is given to the choosing of proper line length externally of the various circulators. Also, the insertion loss of the two directions of transmission is not exactly equal since in the forward direction the energy suffers the loss due to two circulators while in the reverse or reflected direction, the energy loss due to transmission through three circulators should be considered.

When the switchable circulator 80 is reversed so that the dotted arrow applies, it may readily be observed that the input terminal 88 is connected through ports 1 and 3 of the circulator 80 to the ports 2 and 3 of the circulator 86 and thence to the second output terminal 92 of the network. In the reverse direction in this state of the network, the output terminal 92 is connected through ports 3 and 1 of the circulator 86 to ports 3 and 1 of the circulator 84 and thence through ports 2 and 1 of the circulator 82 back to the input terminal 88.

Figure 7:
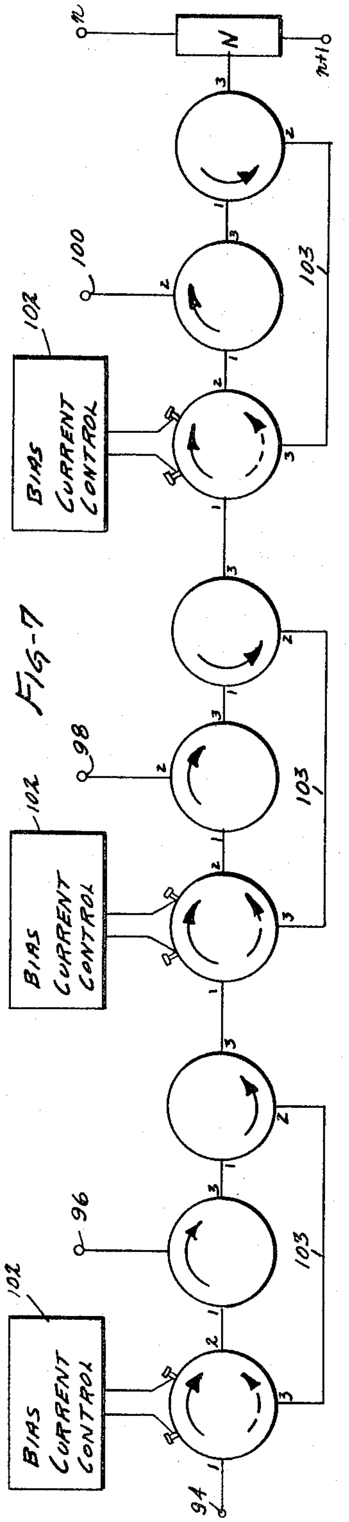
FIG. 7 is a schematic view of the single pole-$n$ throw switching network in a series arrangement in accordance with the present invention.

Referring to FIG. 7, a reciprocal, single pole-*n* throw switching network example of the invention is illustrated. In this example a plurality of the single pole-double throw switching networks, as illustrated in FIG. 6, are combined in a series arrangement with a network input terminal 94 and *n* plus 1 output terminals namely 96, 98, 100, *n*, and *n*+1. Each of these output terminals has associated with it a bias current control 102, the state of which determines whether the input terminal 94 is connected to its associated output terminal or not. In operation it may be verified by observation, in accordance with the description of operation of the switching network components of the previous examples, that the input terminal 94 will be connected to the first output terminal whose switchable circulator is in the state indicated by the solid arrow, and that all output terminals preceding that connected one will be bypassed in accordance with the forward and bypass loops 103 along which the energy is routed by action of the preceding circulators in the dotted arrow state of magnetization. It may also be verified by observation that regardless of whichever state the network is in with respect to the *n* switchable circulators, the network is fully reciprocal.

Figure 8:
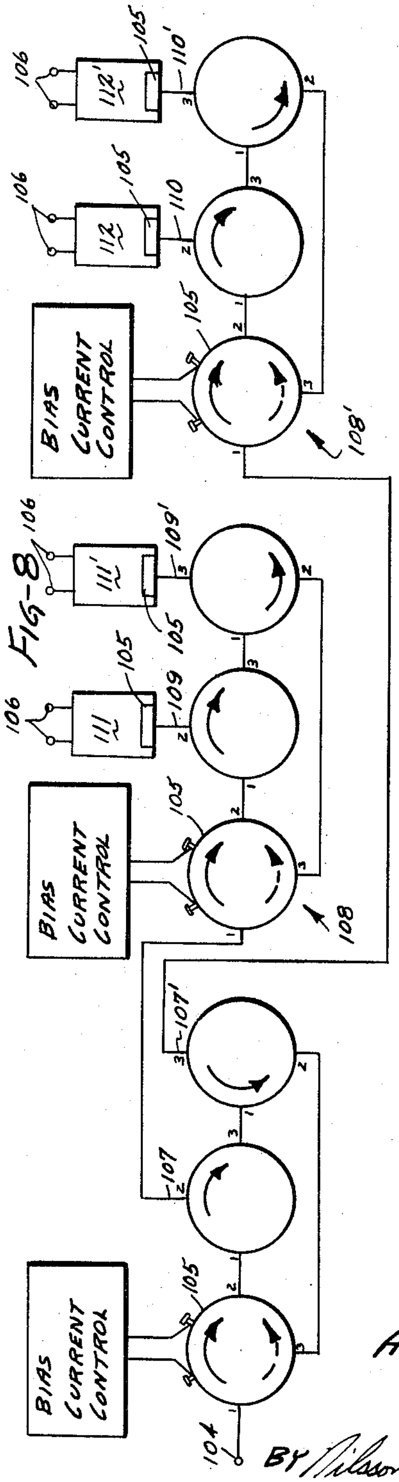
FIG. 8 is a schematic view of an alternative example of a single pole-$n$ throw switch in a parallel arrangement constructed in accordance with the principles of the present invention.

Referring to FIG. 8, an example of the invention is illustrated in which a plurality of the switching networks similar to that illustrated in FIG. 6 are connected in a parallel arrangement so that with a network input terminal 104 energized by incident microwave energy, selected ones of the array of output terminals 106 may be energized depending upon a predetermined program of the states of magnetization of all the network switchable circulators 105. For simplicity of presentation the details of the network are not shown beyond the first branching in which an input single pole-double throw reciprocal switch, whose input pole is the terminal 104, has its output terminals 107, 107' connected respectively to the input terminals of a second and third reciprocal single pole-double throw switch 108, 108'. The output terminals 109, 109' and 110, 110' respectively of the switches 108, 108' are each connected to a respective third echelon or "layer" reciprocal single pole-double throw switches 111, 111', 112, 112' which are, as indicated above, shown only in block form. The output terminals of these third layer switches may be connected to a fifth layer as desired. Each of the switches, in this example, includes a reversible circulator 105, the state of magnetization of which in accordance with a particular program for all those circulators involved in the particular function determines which of the array of output terminals 106 are connected to the input terminal 104. It should be noted that irrespective of the particular program of switching magnetization, the relationship of the input terminal 104 to each of the output terminals 106 is completely reciprocal.

The internal workings of each of these stages utilized in the combinations illustrated in FIG. 7 and FIG. 8 are substantially identical to that disclosed and discussed in connection with FIG. 6 above.

Referring to FIG. 9, a nonreciprocal double pole-double throw switch is illustrated which utilizes a pair of switchable ferrite circulators 116, 118. The electromagnet coils of each of the circulators 116, 118 may be connected in parallel to bias current control 120 so that both the circulators are in the state indicated by the solid arrow or, when the bias current control 120 is reversed, both circulators are in the state of circulation indicated by the dotted arrows.

With the circulators in the state indicated by the solid arrow, the input terminal 122 is connected to the output terminal 124 while the input terminal 126 is connected to the output terminal 128. However, in the reverse direction, the output terminal 124 is connected to the input terminal 126, while the output terminal 128 is connected to the input terminal 122.

When the state of magnetization of the circulators 116, 118 is reversed to that indicated by the dotted arrows, the input terminal 122 is connected to the output terminal 128 and the input terminal 126 is connected to the output terminal 124. Further, in this latter case, it may be seen that the output terminal 124 is connected to the input terminal 122, while the output terminal 128 is connected to the input terminal 126.

Figure 10:
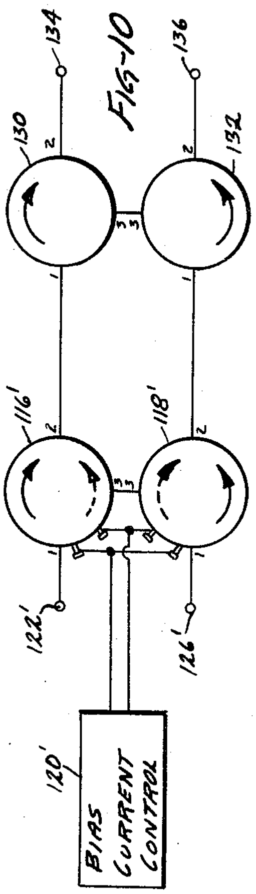
FIG. 10 is a schematic of a double pole-double throw reciprocal switching network constructed in accordance with structural concepts of the present invention.

In FIG. 10 a double pole-double throw reciprocal switching network constructed in accordance with the structural principles of the invention is illustrated. As is apparent from inspection, the structure illustrated in FIG. 9 is repeated except that the second port of the circulator 116' is connected to the first port of a nonreversing three-port ferrite circulator 130; and the second port of the reversible circulator 118' is connected to the first port of a nonreversing ferrite circulator 132. The second port of each of the circulators 130, 132 is connected to, respectively, a first and a second output terminal 134, 136. The third ports of the circulators 130, 132 are interconnected as shown.

In the operation of the reciprocal double pole-double throw switch of FIG. 10, as in the nonreciprocal example of FIG. 9, the direction of circulation of each of the reversible circulators 116', 118', is that implied by the solid arrow with magnetizing current in one direction and that implied by the dotted arrow in the reverse case. Thusly, when the solid arrow situation applies, the first input terminal 122' is connected to the first output terminal 134; and the second input terminal 126' is connected to the second output terminal 136. In this state of the network, it may be verified that the operation is reciprocal by observing that energy traveling from the first output terminal 134 traverses the circulator 130 from its second to its third port and thence from the third to the first port of the circulator 132. From the first port of the circulator 132, the energy traverses the circulator 118' from its second to its third port and thence from the third to the first port of the circulator 116' and is then impressed upon the terminal 122'. The same operation may be seen for energy impressed upon the network at the second input terminal 126' and, respectively reflected from the second output terminal 136.

When the state of the switching network of FIG. 10 is reversed by changing the sense of direction of the current from the bias current control 120', the dotted arrows indicate the direction of circulation associated with the circulators 116', 118'. Again by inspection, it may be verified that in this state the first input terminal 122' is connected to the second output terminal 136; and that the second input terminal 126' is connected to the first output terminal 134. It may also be seen that the action of the switching network is completely reversible by its double pole-double throw action.

There has thus been disclosed and described a number of examples of a reciprocal or nonreciprocal switching network utilizing basically nonreciprocal and nonsymmetrical switching components and which achieve the objects and exhibit the advantages set forth hereinabove.

What is claimed is:

1. Reciprocal single pole-double throw microwave switch network of the character having input and first and second output terminals and comprising: first nonreciprocal microwave junction ferrite circulator of the character including externally controllable means integrally associated therewith for selectively causing nonreciprocal microwave circulation therewithin, and for reversing the sense of rotation of circulation associated therewith and having first, second and third ports; second nonreciprocal circulator having first, second and third ports; and third nonreciprocal circulator having first, second and third ports, said first port of said first circulator being connected to said network input terminal, said second port of said first circulator being coupled to said first port of said second circulator, said third port of said first circulator being coupled to said second port of said third circulator, said second port of said second circulator being coupled to said network first output terminal, said third port of said second circulator being coupled to said first port of said third circulator, and said third port of said third circulator being coupled to said network second output terminal.

2. The invention according to claim 1 in which the sense of rotation of circulation associated with each of said second and third circulators is in the direction of a positive sequence of said first, second and third ports.

3. Microwave switching system having an input terminal and at least $n+1$ output terminals and comprising: $n$ switching networks where $n$ is any positive nonzero integer, each said network including first nonreciprocal microwave junction ferrite circulator of the character including externally controllable means integrally associated therewith for selectively causing nonreciprocal microwave circulation therewithin and for reversing the sense of rotation of circulation associated therewith and having first, second and third ports; second nonreciprocal circulator having first, second and third ports; and third nonreciprocal circulator having first, second and third ports, said first port of said first circulator being connected to said network input terminal, said second port of said first circulator being coupled to said first port of said second circulator, said third port of said first circulator being coupled to said second port of said third circulator, said second port of said second circulator being coupled to one of said network $n+1$ output terminals, said third port of said second circulator being coupled to said first port of said third circulator, and said third port of said third circulator being coupled to a different one of said network $n+1$ output terminals, the sense of rotation of circulation associated with each of said second and third circulators being in the direction of the positive sequence of said first, second and third ports.

4. The invention according to claim 3 in which said first ports of said first circulators of each of said $n$ networks are coupled together providing a single input terminal and $2n$ output terminals.

5. A reciprocal, microwave multilayer switching array, having an input terminal and an array of output terminals, said switching array comprising a plurality of single pole-double throw reciprocal switches each of which includes: first nonreciprocal microwave junction ferrite circulator of the character including externally controllable means integrally associated therewith for selectively causing nonreciprocal microwave circulation therewithin, and for reversing the sense of rotation of circulation associated therewith and having first, second and third ports; second nonreciprocal circulator having first, second and third ports; and third nonreciprocal circulator having first, second and third ports, said second port of said first circulator being coupled to said first port of said second circulator, said third port of said first circulator being coupled to said second port of said third circulator, said third port of said second circulator being coupled to said first port of said third circulator: said plurality of switches being intercoupled in the following manner: said first port of said first circulator of a first switch of said plurality of reciprocal switches being connected to said input terminal of said array, said second port of said second circulator of said first switch being connected to said first port of said first circulator of a second switch, said third port of said third circulator of said first switch being connected to said first port of said first circulator of a third switch, said second port of said second circulator of said second switch being coupled to said first port of said first circulator of a fourth switch, said third port of said third circulator of said third switch being connected to said first port of said first circulator of a fifth switch, said second port of said second circulator of said third switch being connected to said first port of said first circulator of a sixth switch, said third port of said third circulator of said third switch being connected to said first port of said first circulator of a seventh switch.

6. Double pole-double throw nonreciprocal microwave switching network having first and second input terminals and first and second output terminals and comprising first and second nonreciprocal ferrite circulators each having first, second and third ports and electric coils for magnetizing the ferrite element in each said circulator; reversible biasing current supply means coupled to said coils of both said circulators, said first port of said first circulator being coupled to said first input terminal, said first port of said second circulator being coupled to said second input terminal, said second port of said first circulator being coupled to said first output terminal, said second port of said second circulator being coupled to said second output terminal, and said third ports of said first and second circulators being intercoupled, the sense of rotation of circulation associated with both said first and second circulators being in the direction of ascending sequence of their said first, second, and third ports in one state of said reversible current source, and in the direction of descending sequence of their said third, second, and first ports in the reversed state of said reversible current source.

7. Double pole-double throw reciprocal microwave switching network having first and second input terminals and first and second output terminals and comprising first and second nonreciprocal ferrite circulators each having first, second and third ports and electric coils for magnetizing the ferrite element in each said circulator; reversible biasing current supply means coupled to said coils of both said circulators; first and second nonreversing ferrite circulators each having first, second and third ports, said first port of said first reversible circulator being coupled to said first input terminal, said first port of said second reversible circulator being coupled to said second input terminal, said second port of said first reversible circulator being coupled to said first port of said first nonreversing circulator, said second port of said second reversible circulator being coupled to said first port of said second nonreversing circulator, said third ports of said first and second reversible circulators being intercoupled, said third ports of said first and second nonreversing circulators being intercoupled, said second port of said first nonreversing circulator being coupled to said first output terminal, and said second port of said second nonreversing circulator being coupled to said second output terminal.

8. The invention according to claim 7 in which the sense of rotation of circulation associated with said first and second nonreversing circulators is in the direction of ascending sequence of their said first, second and third ports, and the sense of rotation of circulation associated with both said first and second reversible circulators is in the direction of ascending sequence of their said first, second and third ports, in one state of said reversible current source, and in the direction of descending sequence of their said third, second and first ports in the reversed state of reversible current source.

References Cited by the Examiner

UNITED STATES PATENTS

| | | | |
|---|---|---|---|
| 2,818,501 | 12/1957 | Stavis | 333—1.1 X |
| 2,832,054 | 4/1958 | Fox | 333—1.1 |
| 3,032,723 | 5/1962 | Ring | 333—7 |
| 3,205,493 | 9/1965 | Cohen | 333—7 X |

OTHER REFERENCES

Chait et al., New Microwave Circulators, Electronics, Dec. 18, 1959, p. 83.

Clavin, High Power Ferrite Load Isolators, IRE Trans. on MTT, October 1955.

Clavin, Reciprocal and Nonreciprocal Switches Utilizing Ferrite Junction Circulators, IRE Trans. on MTT, May 1963, p. 217.

Park, Scattering Diagram and Some New Nonreciprocal Waveguide Circuits, The Microwave Journal, June 1963, pp. 69, 70.

HERMAN KARL SAALBACH, *Primary Examiner.*

P. L. GENSLER, *Assistant Examiner.*